US007994649B2

(12) United States Patent
Abatemarco (10) Patent No.: US 7,994,649 B2
(45) Date of Patent: Aug. 9, 2011

(54) PELAGIC SUSTAINABLE ENERGY SYSTEM

(76) Inventor: Michael R. Abatemarco, Scottsdale, AZ (US)

( * ) Notice: Subject to any disclaimer, the term of this patent is extended or adjusted under 35 U.S.C. 154(b) by 572 days.

(21) Appl. No.: 12/108,248

(22) Filed: Apr. 23, 2008

(65) Prior Publication Data

US 2009/0267347 A1 Oct. 29, 2009

(51) Int. Cl.
*H02P 9/04* (2006.01)
*F03D 9/00* (2006.01)
*F03B 13/00* (2006.01)

(52) U.S. Cl. ................. 290/43; 290/44; 290/54; 290/55

(58) Field of Classification Search .............. 290/44, 290/43, 55, 54; 60/641.7, 398, 698; 415/4.5, 415/3.1; 416/85, DIG. 6
See application file for complete search history.

(56) References Cited

U.S. PATENT DOCUMENTS

| | | | | |
|---|---|---|---|---|
| 2,060,414 A * | 11/1936 | Fladeland | | 415/69 |
| 2,501,696 A * | 3/1950 | Souczek | | 290/43 |
| 4,274,009 A | 6/1981 | Parker, Sr. | | |
| 5,209,632 A | 5/1993 | Ito | | |
| 6,100,600 A | 8/2000 | Pflanz | | |
| 6,109,863 A * | 8/2000 | Milliken | | 415/1 |
| 6,406,251 B1 | 6/2002 | Vauthier | | |
| 6,531,788 B2 | 3/2003 | Robson | | |
| 6,652,221 B1 * | 11/2003 | Praenkel | | 415/3.1 |
| 6,800,956 B2 * | 10/2004 | Bartlett | | 290/55 |
| 7,109,599 B2 * | 9/2006 | Watkins | | 290/55 |
| 7,218,013 B2 * | 5/2007 | Platt | | 290/55 |
| 7,239,035 B2 | 7/2007 | Garces et al. | | |
| 7,242,107 B1 | 7/2007 | Dempster | | |
| 7,293,960 B2 | 11/2007 | Yamamoto et al. | | |
| 2002/0158472 A1 * | 10/2002 | Robson | | 290/43 |
| 2006/0125242 A1 * | 6/2006 | Fraenkel | | 290/54 |
| 2006/0171798 A1 * | 8/2006 | Yamamoto et al. | | 415/4.5 |
| 2006/0232075 A1 * | 10/2006 | Fraenkel | | 290/54 |
| 2006/0244267 A1 * | 11/2006 | Fraenkel | | 290/54 |
| 2007/0120371 A1 * | 5/2007 | Gehring | | 290/54 |
| 2007/0207028 A1 * | 9/2007 | Nicholas et al. | | 415/3.1 |
| 2008/0116692 A1 * | 5/2008 | Lagstrom et al. | | 290/54 |
| 2008/0232965 A1 * | 9/2008 | Fraenkel | | 416/85 |
| 2008/0284176 A1 * | 11/2008 | Fraenkel | | 290/54 |
| 2010/0074750 A1 * | 3/2010 | Henriksen | | 416/85 |

FOREIGN PATENT DOCUMENTS

GB 2071774 A * 9/1981

OTHER PUBLICATIONS

ISR and Written Opinion for PCT/US09/039811, dated May 26, 2009.

* cited by examiner

*Primary Examiner* — Julio Cesar Gonzalez
(74) *Attorney, Agent, or Firm* — Snell & Wilmer L.L.P.

(57) ABSTRACT

The present invention provides a sustainable energy system for pelagic deployment that may comprise a frame, at least one wind turbine generator coupled to the frame, at least one pair of water turbine generators coupled to the frame, and a rotatable joint.

13 Claims, 9 Drawing Sheets

FIG.9

PELAGIC SUSTAINABLE ENERGY SYSTEM

FIELD OF THE INVENTION

The present invention includes an apparatus for pelagic deployment that can provide a sustainable source of energy. Specifically, an exemplary device features a wind turbine generator, a pair of water turbine generators, and a rotatable joint.

BACKGROUND OF THE INVENTION

The present invention includes an apparatus for pelagic deployment that can provide a sustainable source of energy.

Now, more than ever, sustainable sources of energy are needed to both alleviate humankind's dependence on non-renewable resources and support the world's growing energy needs. The world's supply of fossil fuels dwindles daily. Coal, oil, and natural gas comprise the majority of the world's energy sources. A global energy crisis would be inevitable if the fossil fuel resources are depleted without first devising robust, sustainable solutions.

At the same time, the world's human population continues to grow as more nations become industrialized. This growth requires an ever-increasing source of energy to sustain itself. As fossil fuels become scarce and fuel prices increase, the populations that depend on these resources will suffer.

Notwithstanding their decreasing supply, the use of fossil fuels causes and will continue to cause adverse environmental effects. It is believed that smog and global climate change are among these adverse effects.

There are known sources of sustainable energy. These include energy harnessed from the movement of air ("wind") and water. To capture the kinetic energy of these fluids, a turbine generator is typically employed. A turbine generator has one or more propellers that resist the movement of the fluid. The energy of the fluid drives the propellers and, in turn, drives a generator. The generator produces electrical energy that can be used, transmitted across a distance for use, or stored for later use.

There is a need for a sustainable, worldwide source of energy. This need is especially great in areas of the world without sufficient natural resources and/or the capability to produce nuclear energy. There is a need for a source of energy that will produce fewer adverse environmental effects than the use of fossil fuels. There is a need for a source of energy that can be deployed on an international scale.

SUMMARY OF THE INVENTION

The present invention allows for the pelagic deployment of sustainable electricity generating devices in an adjustable, customizable manner, allowing for the optimization of electricity generation. The aggregation of multiple types of sustainable electricity generating devices in one invention results in increased efficiencies.

According to various aspects and embodiments, the present invention provides a sustainable energy system for pelagic deployment comprising a frame; at least one wind turbine generator, said at least one wind turbine generator coupled to said frame; at least one pair of water turbine generators, said at least one pair of water turbine generators coupled to said frame; and a rotatable joint.

According to various aspects and embodiments, the present invention may also or alternatively further comprise at least one electromagnetic radiation transmission device, said electromagnetic radiation transmission device coupled to said frame. According to various aspects and embodiments, the present invention may also or alternatively comprise at least one solar panel, said at least one solar panel coupled to said frame. According to various aspects and embodiments, the present invention may also or alternatively be construed such that the at least one pair of water turbine generators rotate in opposing directions. The present invention may include at least one power handler.

In various aspects and embodiments, the present invention may be configured to optimize and, alternatively or in combination, maximize fluid flow across the turbines.

DETAILED DESCRIPTION

The invention is described with reference to the enclosed Figures wherein the same numbers are used where applicable. The term "water surface level" means the surface of any naturally occurring or manmade body of water. The term "electricity generating device" means any of the constituent elements of the present invention that is capable of generating electricity, specifically, a wind turbine generator, a water turbine generator, a solar panel, or any combination thereof.

The cost of constructing structures that generate power from just one source of sustainable energy is high. However, by using one structure in conjunction with multiple electricity generating devices, the present invention allows for achievement of significant efficiencies in the generation of electricity. Accordingly, the combination of multiple forms of electricity generating devices may provide an increasing marginal return on investment. Additionally, by adjusting the various electricity generating devices for maximum efficiency further enhances these benefits. The lunar effect causes the tides to rise to their highest point during a full moon and a new moon (when the moon is not visible from the Earth). This causes a constant gravitational pull on the Earth as the sun, earth and moon are in line. This movement causes the motion in the tides which is caused by the water current movement due to constant gravitational pull.

In various embodiments, devices in accordance with the present invention are capable of generating usable electrical energy from wind energy, water flow and, optionally, solar energy and various combinations thereof. For example, the present invention is capable of harnessing the mechanical energy of wind and converting it into electrical energy. In various embodiments, the capability of harnessing the mechanical energy of wind is implemented via a turbine generator. A turbine generator is a device that converts the mechanical energy of a fluid flow into electricity. Although many embodiments exist, turbine generators typically consist of a shaft with perpendicularly attached propellers that rotate in response to a fluid flow. The mechanical energy of this rotation is then converted into electricity inside the turbine generator.

In various embodiments, devices in accordance with the present invention are capable of generating usable electrical energy from wind energy. As noted above, a turbine generator is a device that converts the mechanical energy of a fluid flow into electricity. A wind turbine generator is a type of turbine generator constructed so that wind is used as the fluid that causes rotation of the propellers. In some embodiments and applications, the use of one wind turbine generator is preferred. In other embodiments and applications, the use of several wind turbine generators is preferred.

In various embodiments, devices in accordance with the present invention are capable of generating usable electrical energy from water flow energy. The present invention is capable of harnessing the mechanical energy of a flowing fluid and converting it into electrical energy. Water currents are a good source of kinetic energy as water currents may be up to 1,000 times as dense as wind currents. Water currents may also be more consistent that wind currents. In many instances, water currents flow throughout the day and night. In various embodiments, the capability of harnessing the mechanical energy of a fluid flow is implemented via a turbine generator. As noted above, a turbine generator is a device that converts the mechanical energy of a fluid flow into electricity. A water turbine generator is a type of turbine generator constructed so that water is used as the fluid that causes rotation. In some embodiments and applications, the use of a singular water turbine generator is preferred. In other embodiments and applications, the use of a plurality of water turbine generators is preferred. As described herein, in some embodiments, a plurality of water turbine generators may be deployed in pairs configured to rotate such that the sum of their rotating force may help stabilize the frame.

In various embodiments, devices in accordance with the present invention contain a frame. A frame is any structure or assembly configured to support the other constituent elements of the present invention. The frame may comprise a single pole or a combination of poles. The frame may comprise a truss structure or a combination of truss structures. The frame preferably is constructed of materials that resist corrosion. In this regard, the frame may contain a system for corrosion resistance, such as a cathodic protection system typically used to combat corrosion due to salt water environments. In various embodiments, the frame includes at least one rotatable joint. A rotatable joint is a joint that attaches one portion of the frame to another. The rotatable joint allows rotation of from about 1 degree up to and including about 360 degrees. A rotatable joint in accordance with this invention may rotate within any subrange of degrees from about 1 degree up to and including about 360 degrees. The rotatable joint may be any joint capable of supporting the frame and making such rotation possible. In one embodiment, for example, two discs with holes drilled perpendicular to the surface are disposed coaxially. In this embodiment, movable bolts may be inserted through the holes of both discs to prevent movement of the discs relative to each other. The bolts may be temporarily removed so that the discs may rotate relative to each other.

In various embodiments, devices in accordance with the present invention contain an automated positional controlling system. The positional controlling system is capable of positioning various components of the present invention. Preferably, the positional controlling system positions various components so as to maximize their efficacy or efficiency or a combination thereof. In various embodiments, the positional controlling system includes at least one master controller, at least one sensing device, and at least one position controller. The at least one sensing device is any device capable of sensing environmental conditions and delivering that data to the master controller. The master controller is any device capable of receiving data, processing the data, and sending commands to one or more position controllers. A position controller is a device configured to control the position of various mechanical components relative to a reference structure.

In various embodiments, devices in accordance with the present invention may also be capable of generating electrical energy from the sun's light. This capability includes the ability of converting light into electrical energy. In various embodiments, this capability is implemented with a solar panel. Solar panels may also be referred to as photovoltaic cells. In other embodiments, this capability is implemented via a solar thermal energy system.

In various embodiments, devices in accordance with the present invention are preferably used in pelagic deployments. Offshore environments generally allow for greater exposure to wind and water flow. These environments also minimize the impact to other human activities. Offshore placement lessens human visibility, which may be beneficial in some applications. Energy produced by the present invention may be used, stored, or transmitted. Energy produced by the present invention may be transmitted to a land-based electrical facility. Transmission to a land-based facility may be accomplished in conjunction with a power handler, as described herein below. A land-based electrical facility is any electrical facility that can use, transmit, or store electrical energy. An underwater transmission line is one method of transport. The method of underwater transmission may be via high voltage alternating current or high voltage direct current. As is common with underwater electrical transmission lines, high voltage direct current offers transmission advantages. A power handler may be used to adjust voltage to the appropriate level for transmission. The aggregation of multiple electricity generating devices coupled with the utilization of one underwater transmission line may enhance the efficiency of the present invention.

In various embodiments, devices in accordance include at least one electromagnetic radiation transmission device. The electromagnetic radiation transmission device may be any device capable of transmitting or receiving electromagnetic radiation across a distance.

In various embodiments, devices in accordance with the present invention include an auxiliary support structure. An auxiliary support structure is a structure that is capable of supporting one or more of the electricity generating devices.

In various embodiments, devices in accordance with the present invention include a base. A base is any structure capable of securing the frame to the floor of a body of water. The base must be capable of supporting the weight of the frame and any elements attached to the frame. The base may optionally be coupled to one or more water turbine generators. In embodiments where the base is coupled to one or more water turbine generators, the water turbine generators may be configured such that water flows through the base. The base may optionally contain wiring for connection to a power handler and/or a land-based electrical facility.

In various embodiments, devices in accordance with the present invention include a power handler. A power handler may be any device through which power may flow. Power may be electricity. A power handler may change the nature of the power that flows through it. For example, a power handler may comprise an inverter for converting incoming direct current (DC) power to outgoing alternating current (AC) power. Also for example, a power handler may comprise a rectifier for converting incoming alternating current (AC) power to outgoing direct current (DC) power. A power handler may comprise a transformer for adjusting the voltage of power. A power handler may act as a gateway, receiving inputs from at least one power generating source and transmitting power to a remote location. A power handler may be waterproof to various pressures. In various embodiments, at least one frame may be electrically connected to a power handler. One or more water turbines or wind turbines may connect to a power handler. The power handler may rectify AC power to DC power and then upwardly adjust the voltage for transmission. A power handler may invert DC power to AC power and then upwardly adjust the voltage for transmission. A power handler may be connected to an underwater cable for transmission of power to a remote location.

Now referring to the several exemplary embodiments illustrated in FIGS. 1-9 and referring to Figures herein, the frame 4 is a structure that supports the other constituent elements of the present invention. The frame 4 can be constructed of any material suited for the physical support of the other constituent elements. The frame 4 may be constructed of steel, steel alloy, or any other metal in a fashion consistent with the ability to support the electricity generating devices. As mentioned above, in some embodiments, the frame 4 is constructed so as to minimize corrosion due to pelagic deployments. In some embodiments, the frame 4 is equipped with systems for the prevention of corrosion. One such system is a cathodic protection system. Other systems include coatings and materials that resist corrosion caused by exposure to salt water environments. A frame 4 may be embedded directly into the floor of a body of water. A frame 4 may be attached to a base 10.

In various embodiments, the frame 4 may comprise one or more posts. A post may be any structural elements capable of supporting a weight load. In various embodiments, it is preferable that the frame include a single shaft. In other embodiments and applications, it is preferable that the frame 4 contain a plurality of interconnected struts. In still other embodiments, it is preferable to configure the frame as a truss structure. The truss structure may optionally be configured to have support structures to prevent undesirable movement. In various embodiments, the frame 4 includes at least one rotatable joint 7 as described herein. The frame also comprises at least one coupling location 2 for the coupling of various energy generating devices to the frame. The coupling location 2 is any place on the frame 4 that is capable of mounting one of the electricity generating components to the frame 4 or is capable of attaching an auxiliary structure.

The wind turbine generator 1 is capable of taking the mechanical energy of flowing air and converting it into electrical energy. In various embodiments, the propellers 15 of the wind turbine generator 1 are configured to be parallel to the frame 4. In various embodiments, the wind turbine generator 1 has three propellers 15. In other embodiments, the wind turbine generator 1 has four propellers. The propellers 15 are blades that extend outward from the axis of the wind turbine generator 1 and allow for the harnessing of the wind's mechanical energy. There may be any suitable number of propellers on a given wind turbine. In various embodiments, three propellers are used. The propellers may be constructed of any material suitable for such purpose. Exemplary materials include steel, aluminum, titanium, tin, steel alloys, carbon materials, polymer materials, polycarbonate, and any other light weight, rigid material. The propellers 15 converge on an axis; that axis is generally a shaft which drives a generator that produces electrical energy. In various embodiments, there is one wind turbine generator 1. However in other embodiments in various applications, it may be preferable to use several wind turbine generators. A wind turbine generator 1 generally operates at peak efficiency when the wind turbine generator 1 is aligned with respect to the wind flow such that the flow of air may turn the propellers of the wind turbine generator 1 which are connected to a generator for the generation of electricity. When multiple wind turbines are used, the multiple wind turbines may have different propeller sizes.

Figure 6:
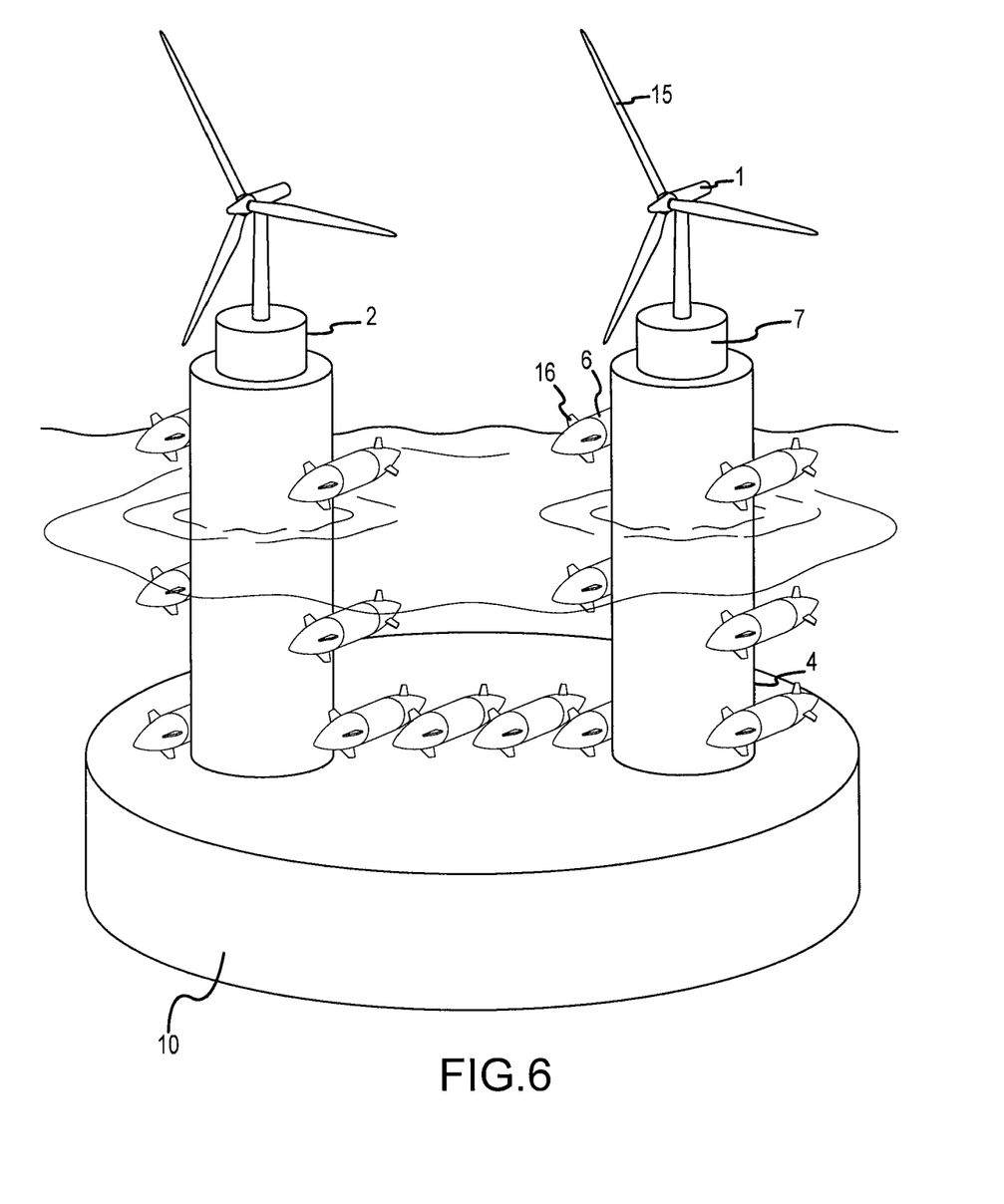
FIG. 6 is an exemplary embodiment of the present invention.
Figure 7:
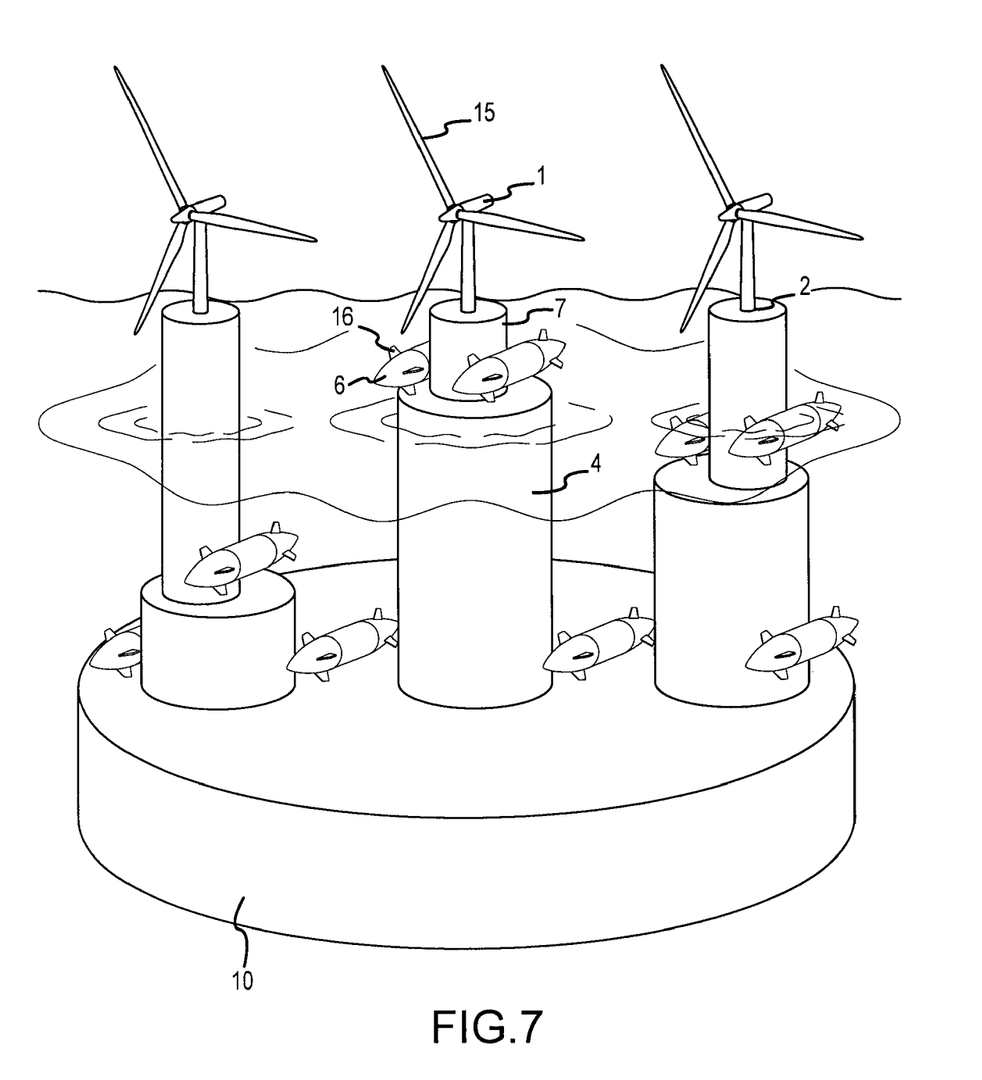
FIG. 7 is an exemplary embodiment of the present invention.
Figure 9:
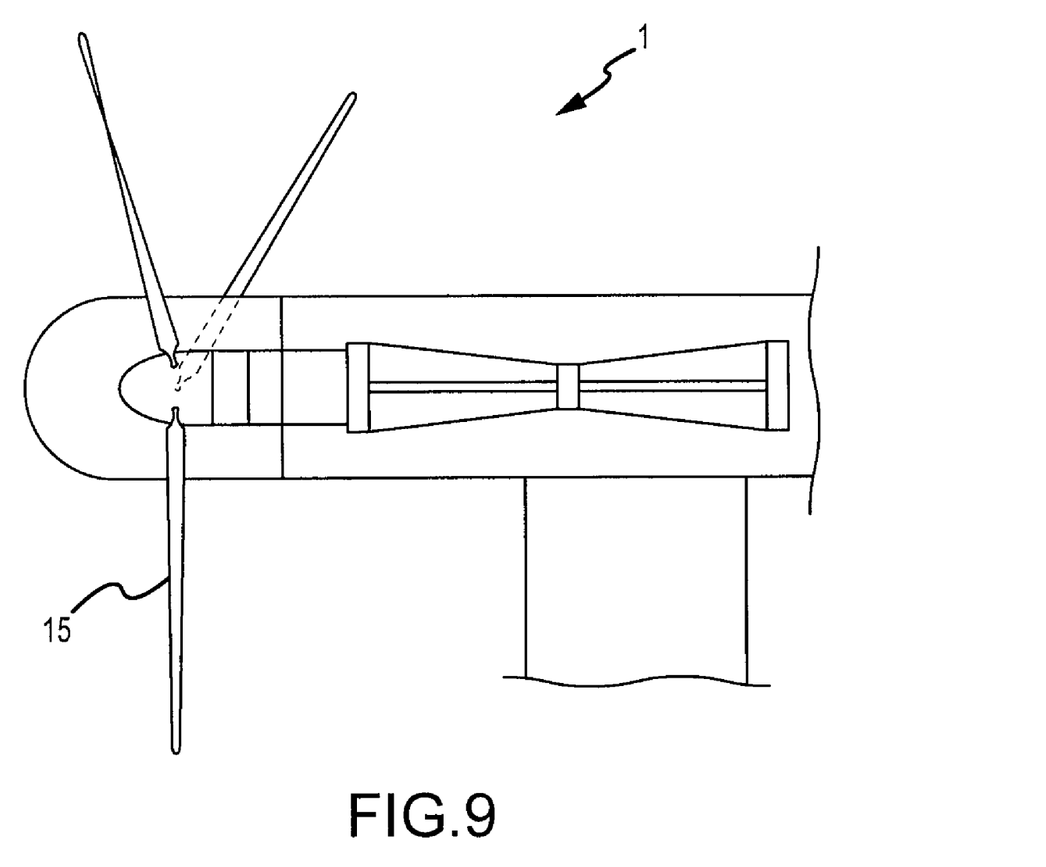
FIG. 9 is an exemplary embodiment of a wind turbine that may be used in conjunction with the present invention.

Wind turbine generators 1 used in connection with the present invention may be designed to operate in a peak windspeed range. A peak windspeed range includes a range of windspeeds at which the turbine generates power at optimal efficiency. Multiple wind turbines may be used wherein the wind turbines are designed to operate in varying peak windspeed ranges. Wind turbine generators are preferably configured to prevent excessive angular speed. Excessive angular speed includes angular speed that may cause damage to the turbine generator or the frame 4. Excessive angular speed also includes unnecessary and potentially damaging vibration. Many ways of preventing excessive angular speed are possible. One such method is the use of a gear system to alter resistance to a force. In various embodiments and in various applications, wind turbine generators in accordance with the present invention may be optimized at wind speeds up to 150 mph; preferably, below 100 mph, and more preferably below 60 mph. Wind speed optimization is an application-specific process that depends upon the particular proposed location of deployment. Accordingly, among various embodiments of the present invention, wind speed optimization may vary in accordance with the predicted wind conditions of a given environment. FIG. 9 depicts an exemplary wind turbine. As depicted in FIGS. 6 and 7, in some embodiments, several wind turbines may be used. In such embodiments, each wind turbine may be optimized to a different optimal wind speed. In this manner, at least one wind turbine may operate in its optimum range for a given wind speed. Varying heights of wind turbines may be most beneficial in deployment areas where wind speed is irregular. In still other embodiments, where several wind turbines are used, wind turbines may be deployed at varying heights, such as depicted in FIG. 7. In this manner, the wind turbines may take advantage of differing wind speeds at varying heights. The wind turbine generator 1 may be attached to the frame directly or via an auxiliary support structure 3 as described herein. At the coupling point 2 in various embodiments there may be a position controller 8 as described herein.

Figure 8:
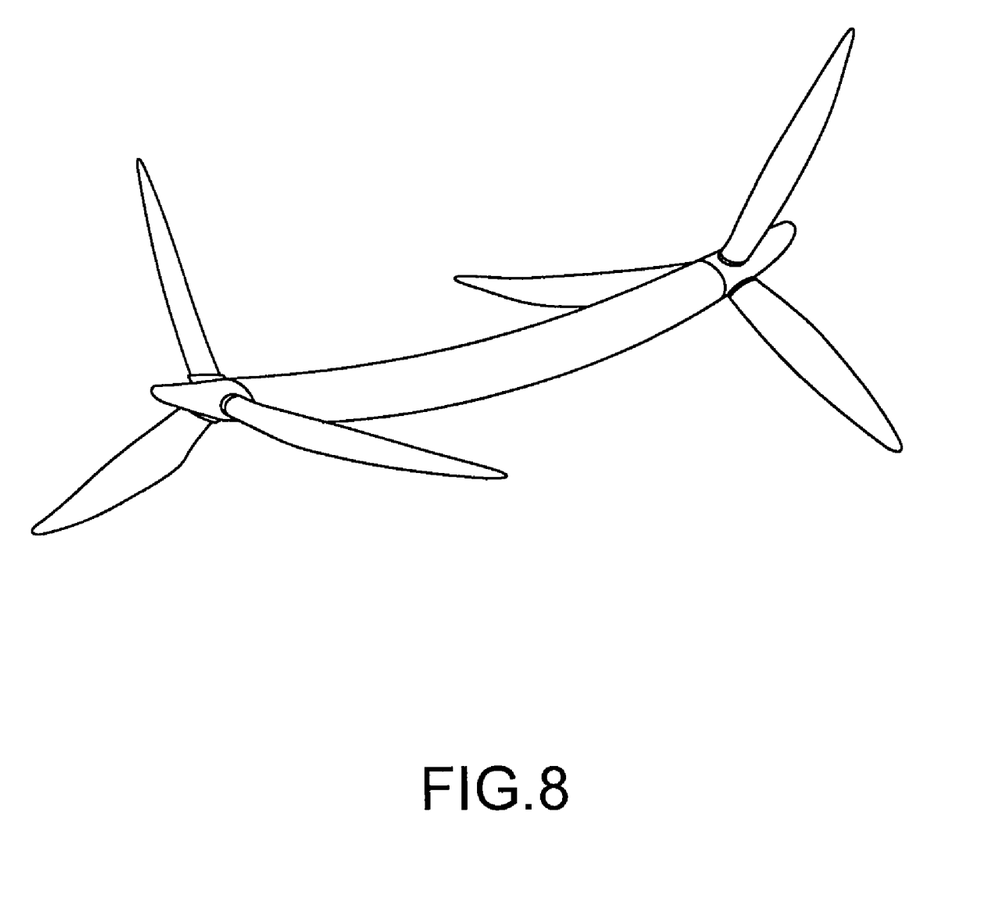
FIG. 8 is an exemplary embodiment of a water turbine that may be used in conjunction with the present invention.

The water turbine generator 6 converts the mechanical energy of water into electrical energy. Structurally, the turbine generator is similar to the wind turbine generator 1 except that the water turbine generator 6 is optimized for the use of water as the fluid that provides mechanical energy. A water turbine generator 6 generally has propellers 16 that extend radially from a center point, alternately referred to as a head. Water flow moves the propellers 16 about the center point and the water turbine generator 6 converts this motion into electrical energy. The propellers may be enclosed in a shroud structure. Preferably, the propellers are not enclosed in any structure. Any type of water turbine generator 6 may be used. Known water turbine generators include, but are not limited to, the Kaplan turbine generator, the Pelton turbine generator, the Turgo turbine generator, the Francis turbine generator, and the Bulb turbine generator. The water turbine generator 6 can be any type of water optimized turbine generator known now or developed hereafter. The water turbine generator 6 may optionally contain any mechanism to prevent excessive angular speed. Mechanisms to prevent excessive angular speed may not be necessary due to the inherent damping effects of water. The water turbine generator may be geared to different optimal power generating speeds. As depicted in FIG. 8, in some embodiments, the water turbine generator 6 may comprise two (2) heads, each with its own set of propellers. Each head may be configured for a different optimal water flow direction. Optimal water flow direction is the direction of water flow in which the turbine generates electricity most effectively. In some embodiments, the different optimal water flow directions may be the opposite of each other. In such embodiments, when there is an optimal water flow at one head, the other head of the turbine may either spin at suboptimal speeds and freewheel. In some embodiments, the dual headed turbine may efficiently generate electricity given varying water flow directions. In various embodiments the dual headed turbine includes heads that are disposed on the same axis. The dual headed turbine may include heads that are not disposed on the same axis. In such embodiments, having heads disposed on different axes may be beneficial in harnessing varying water currents.

In various embodiments, it is preferable to have a plurality of water turbine generators. In embodiments and applications of the present invention where a plurality of water turbine generators 6 is used, the plurality of water turbine generators is preferably configured in pairs. However, in some embodiments and in some applications it may be preferable to use one turbine generator or an odd number of water turbine generators. A water turbine generator generally operates at peak efficiency when the water turbine generator 6 is aligned with respect to the water flow such that the flow of water may turn the propellers of the water turbine generator 6. The water turbine generator 6 may be constructed of any suitable material including a variety of metals including steel, steel alloy, and/or a number of high strength polymers. In various embodiments, the water turbine generator 6 is attached to the frame 4 at a coupling location 2 on the frame 4. The water turbine generator 6 may be attached height of the frame 4. In some embodiments where multiple water turbines are used, for example as depicted in FIG. 6, the water turbines generators 6 adjustably attach at varying heights and directions to take advantage of varying water flow currents at various heights and directions. In various embodiments, water turbines generators may be disposed at heights such that one or more water turbines are not submerged in water for all or part of a day. The water turbine generator 6 may be attached either directly to the frame 4 or via an auxiliary support structure 3 as described herein. In various embodiments, the water turbine generator may be coupled to the frame such that the water turbine generator is disposed within the frame. In this configuration, water flow may pass through the frame. There may also be a position controller located at the connection between the water turbine generator 6 and the frame 4 as described herein.

In embodiments and applications of the present invention where a plurality of water turbine generators is used, the propellers of each pair are preferably configured to rotate in opposing directions. By rotating in opposing directions, the centrifugal force of each water turbine generator would offset each other. The net centrifugal force of each pair of water turbine generators would approach zero, minimizing disruption to the frame 4. Additionally, the gyroscopic effects of the opposing rotations may be beneficial. On such benefit may be the stabilization of the overall structure.

Figure 1:
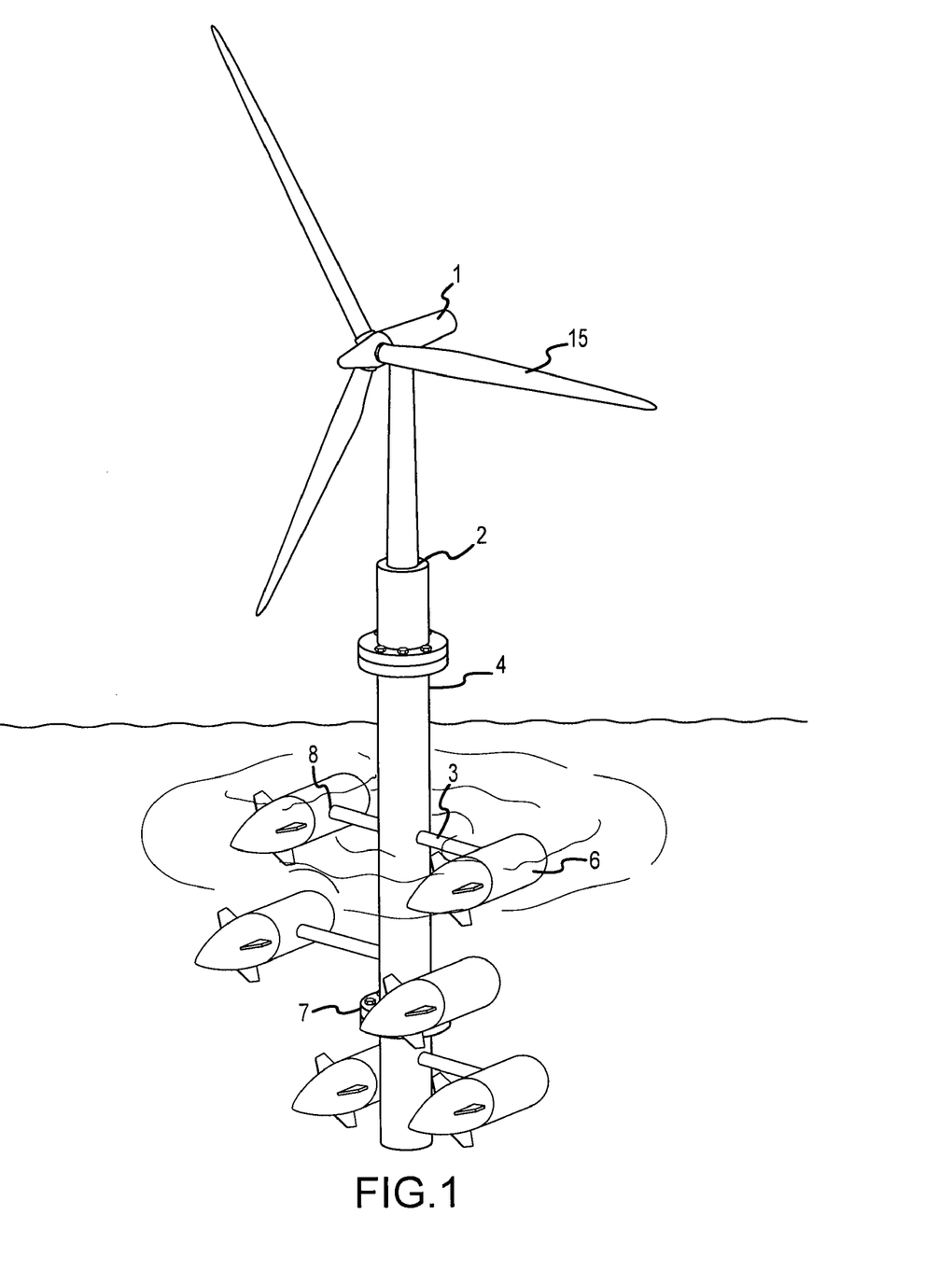
FIG. 1 is an exemplary embodiment of the present invention.
Figure 2:
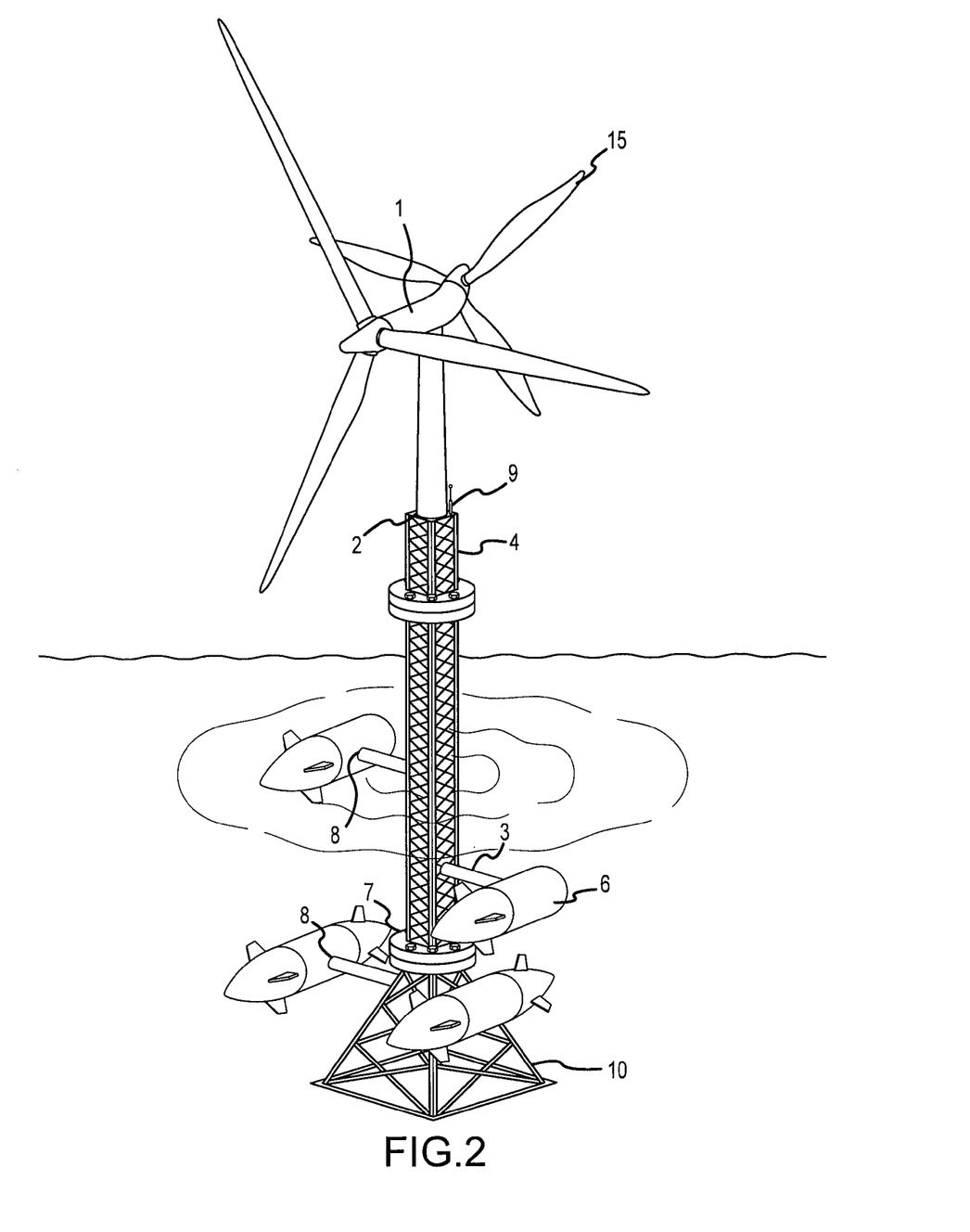
FIG. 2 is an exemplary embodiment of the present invention.
Figure 3:
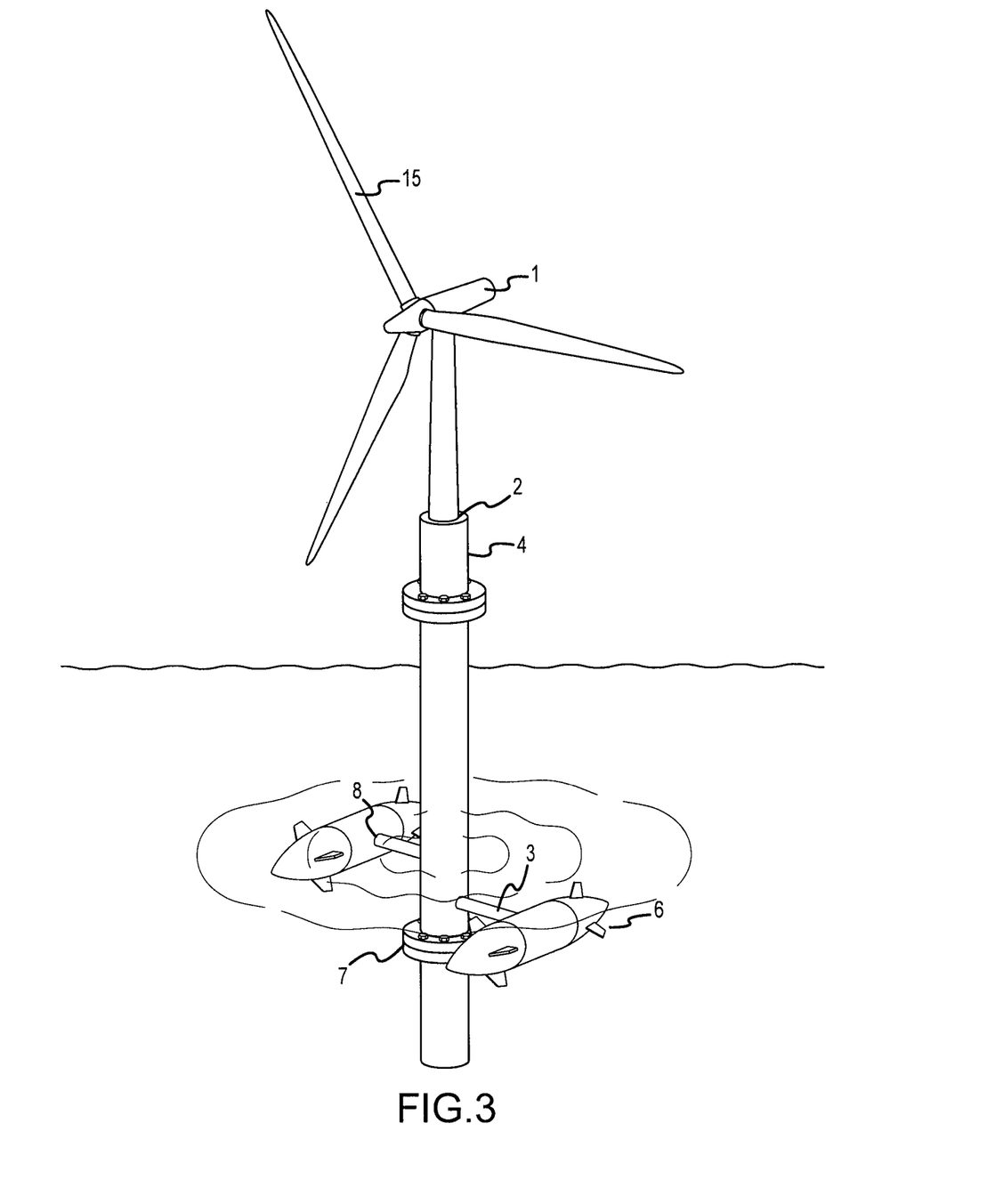
FIG. 3 is an exemplary embodiment of the present invention.
Figure 4:
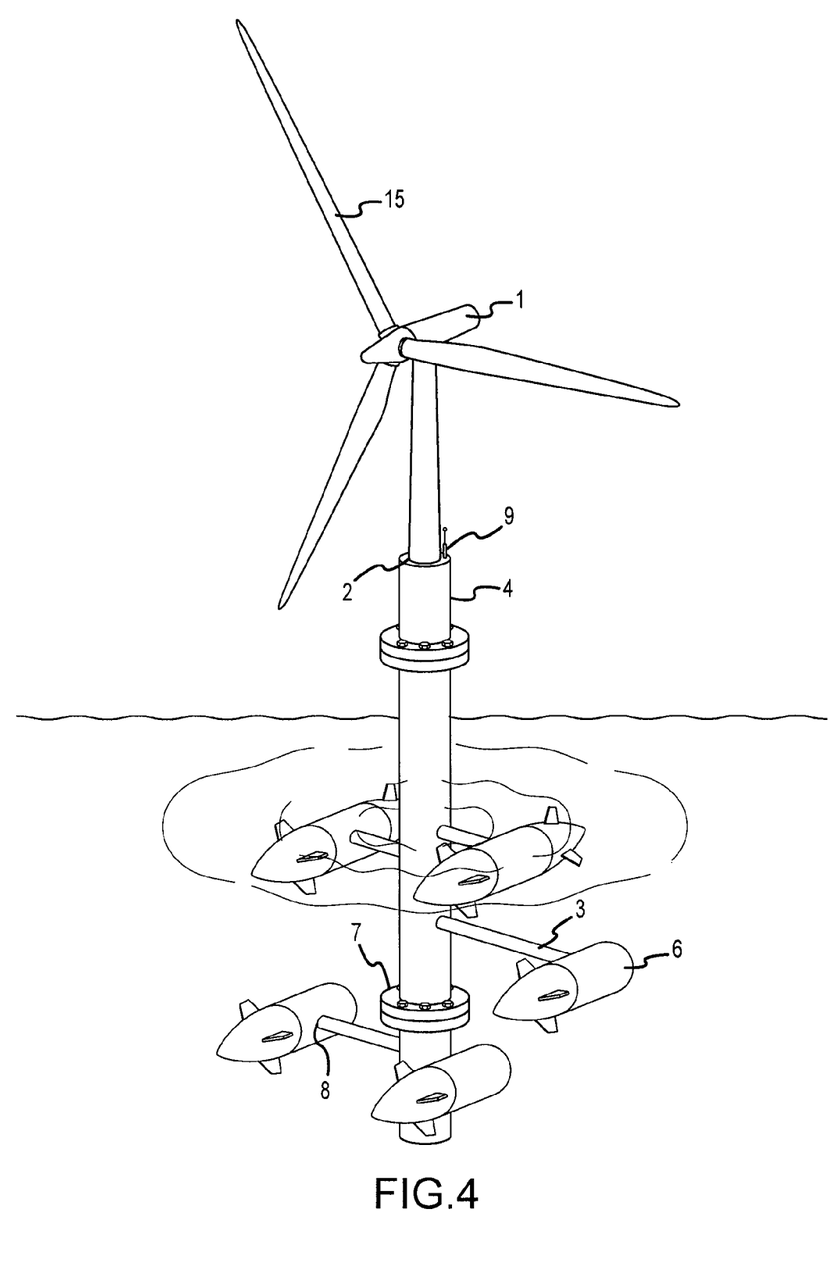
FIG. 4 is an exemplary embodiment of the present invention.
Figure 5A:
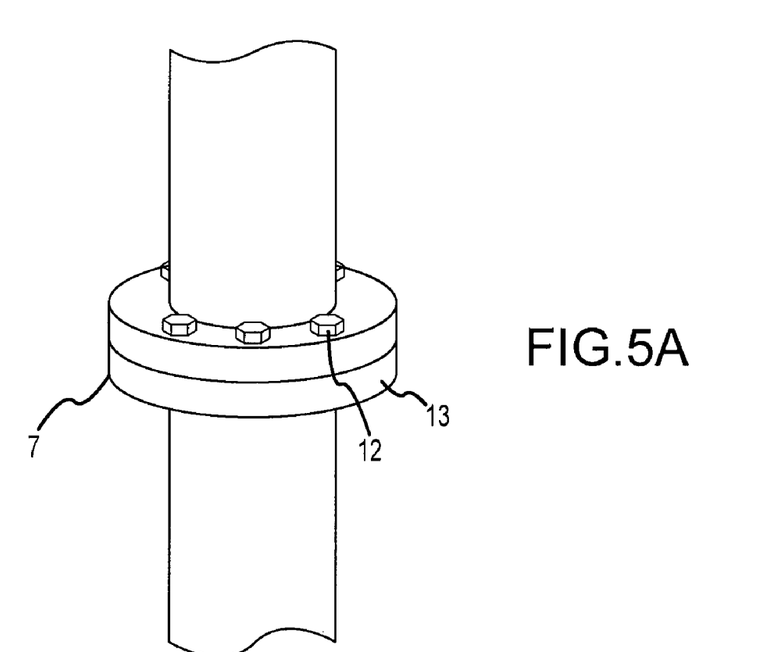
FIGS. 5A and 5B depict an exemplary embodiment of a rotatable joint.
Figure 5B:
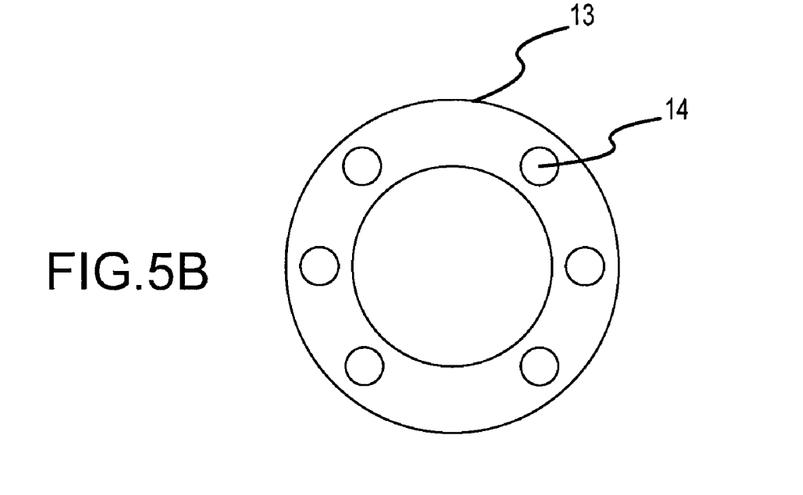

Various embodiments of the present invention include a rotatable joint 7. A rotatable joint 7 is a joint that connects one portion of the frame 4 to another. The rotatable joint 7 allows rotation of from about 1 degree up to and including about 360 degrees. A rotatable joint 7 in accordance with this invention may rotate within any subrange of degrees from about 1 degree up to and including about 360 degrees. The rotatable joint 7 is capable of rotating without disturbing any internal components that reside inside the frame 4. The rotatable joint 7 is optionally coupled to a position controller 8 to allow for controlled movement. The rotatable joint 7 allows the frame to rotate in accordance with the positional controlling system 8 to provide maximum efficiency and/or efficacy to the various attached electricity generating components. In an exemplary embodiment, the rotatable joint 7 is comprised of two discs 13 with holes 14 drilled perpendicular to the surface wherein the two discs 13 are disposed coaxially. In this embodiment, movable bolts 12 may be inserted through the holes of both discs to prevent movement of the discs 13 relative to each other. The bolts 12 may be temporarily removed so that the discs 13 may rotate relative to each other. In this manner, the wind turbine may achieve maximum efficiency of the wind direction and the water turbines may achieve maximum efficiency of water current direction.

The solar panel is a device capable of generating electricity from the sun's light or any ambient light. A solar panel can be comprised of photovoltaic cells. Photovoltaic cells convert light energy from the sun into electrical energy. Typically, photovoltaic cells produce electricity in the direct current form. Generally, solar panels are positioned to track the sun. Accordingly, in preferred embodiments of the present invention, a solar panel is configured to track the sun via a position controller as described herein. The solar panel is attached to the frame at a coupling location directly or via an auxiliary support structure. The auxiliary support structure may include a position controller as described herein.

In various embodiments, devices in accordance with the present invention include at least one electromagnetic radiation transmission device 9. The electromagnetic radiation transmitted by the device may be of any frequency and wavelength. The electromagnetic radiation transmission device 9 may be used to facilitate communications. The electromagnetic radiation transmission device 9 may be used in a cellular telephone network. The electromagnetic radiation transmission device 9 may also be used to broadcast television or radio communication signals. The electromagnetic radiation transmission device 9 may be used to broadcast communication signals to satellites orbiting the Earth. In some embodiments, the electromagnetic radiation transmission device 9 contains a transmitting structure. The transmitting structure may be an antenna. The antenna may be a parabolic antenna or any other type of antenna. The electromagnetic radiation transmission device 9 may be coupled to the frame 4. Alternatively, the electromagnetic radiation transmission device 9 may be coupled to any electricity generating component.

The optional auxiliary support structure 3 is any structure that is capable of supporting one of the electricity generating components of the present invention. The auxiliary support structure 3 couples one or more of the electricity generating components to the frame 4. Exemplary embodiments are constructed of steel or steel alloys. Exemplary structures include beams, rods, brackets, braces, rivets, and combinations thereof. The auxiliary support structure 3 is connected to a coupling location 2 on the frame 4 and allows for mechanical connection and/or electrical connection to the electrical generating component it supports. The auxiliary support structure 3 may also be outfitted with a position controller 8 as described herein. When an electricity-generating device is coupled to the frame 4, it may be coupled either directly to the frame 4 or via an auxiliary support structure 3.

The base 10 is any structure capable of securing the frame 4 to the floor of a body of water. The base 10 may be constructed of any material capable of supporting the weight of the frame 4 and any elements attached to the frame. The base 10 may secure the frame 4 to the floor of a body of water by any suitable means. Any conventional means of securing the frame to prevent unwanted movement may be used. One such means would be via bolts attached to the floor of a body of water. Another would be by weight alone. The base 10 may optionally include one or more water turbine generators 6. In various embodiments, water turbine generators 6 are attached to the base in pairs. The water turbine generator 6 is attached to the base 10 either directly or via an auxiliary support structure 3 as described herein. There may also be a position controller located at the connection between the water turbine generator 6 and the base 10 as described herein.

The positional controlling system is capable of variably positioning various components of the device. The positional controlling system is comprised of at least one master controller, at least one sensing device, and at least one position controller 8. The sensing device, not depicted in the Figures, is any device that is able to sense environmental condition data. Environmental condition data is any piece of information regarding the current state of the surrounding environment of the present invention. Examples of environmental condition data include ambient air temperature, ambient air pressure, wind speed, wind direction, water flow rate, water flow direction, ambient light, direction of ambient light origination, water temperature, and weather data. This list is not exclusive. Devices that may read this type of data include thermometers, barometers, anonometers, photosensitive devices, light meters, and clocks. This list is not exclusive. The sensing device is capable of converting the environmental condition data into a digital or analog signal for transmission to the controller. The master controller is any type of device that is capable of receiving data, processing data, and sending commands to one or more position controllers. The master controller may be a computer or other means for the electronic implementation of logic. The master controller may be in electrical or radio communication with the sensing device. Processing the data is generally understood to mean making operational efficiency and/or efficacy decisions based on the environmental data. The master controller uses environmental data to execute programmed positional logic. The master controller's positional logic determines how the electricity generating components of the invention should be positioned based on the environmental data. The position controller is a device capable of positioning one of the electrical generating components. The position controller 8 and the motor device that is coupled either the auxiliary support structure 3 or the coupling location 2 on the frame 4 is able to move enough energy producing devices. In exemplary embodiments, a wind turbine generator 1 is movable via the position controller 8. For example, if the wind is blowing in a southwesterly direction, the sensors would be able to detect this piece of environmental data. Then, the sensors would transmit these data to the master controller, which would process the data and command the position controller to adjust the position of the wind turbine generator 1. As another example, one of the sensors could sense the water flow rate and send that data to the master controller which could then command a position controller to move the water turbine generator 6 to adjust its position. The positional controlling system may also be accessible via satellite or via the Internet for remote control or monitoring by a human user.

Finally, as used herein, the terms "comprise", "comprises", "comprising", "having", "including", "includes", or any variation thereof, are intended to reference a non-exclusive inclusion, such that a process, method, article, composition or apparatus that comprises a list of elements does not include only those elements recited, but can also include other elements not expressly listed and equivalents inherently known or obvious to those of reasonable skill in the art. Other combinations and/or modifications of structures, arrangements, applications, proportions, elements, materials, or components used in the practice of the instant invention, in addition to those not specifically recited, can be varied or otherwise particularly adapted to specific environments, manufacturing specifications, design parameters or other operating requirements without departing from the scope of the instant invention and are intended to be included in this disclosure.

Moreover, unless specifically noted, it is the Applicant's intent that the words and phrases in the specification and the claims be given the commonly accepted generic meaning or an ordinary and accustomed meaning used by those of reasonable skill in the applicable arts. In the instance where these meanings differ, the words and phrases in the specification and the claims should be given the broadest possible, generic meaning. If it is intended to limit or narrow these meanings, specific, descriptive adjectives will be used. Absent the use of these specific adjectives, the words and phrases in the specification and the claims should be given the broadest possible meaning. If any other special meaning is intended for any word or phrase, the specification will clearly state and define the special meaning.

I claim:

1. A sustainable energy system for pelagic deployment comprising:
   a frame comprising an upper portion and a base, wherein said base is configured to be fixedly attached to a floor of a body of water;
   at least one wind turbine generator, said at least one wind turbine generator coupled to said frame;
   at least one pair of water turbine generators, said at least one pair of water turbine generators coupled to said frame;
   a rotatable joint disposed between said upper portion and said base, wherein said rotatable joint allows said upper portion to rotate relative to said base;
   a second rotatable joint disposed in said upper portion, wherein said upper portion comprises a first portion and a second portion, wherein said first portion is closer to said base than said second portion;
   a positional controlling system disposed in said frame configured to control rotation about said rotatable joint and said second rotatable joint,
   wherein said at least one wind turbine generator is coupled to said second portion,
   wherein said at least one pair of water turbine generators is coupled to said first portion,
   wherein said positional controlling system disposed in said frame is configured to rotate said second portion in accordance with ambient wind direction by causing rotation about said second rotatable joint, and
   wherein said positional controlling system disposed in said frame is configured to rotate said first portion in accordance with ambient water current by causing rotation about said rotatable joint.

2. The sustainable energy system for pelagic deployment of claim 1, further comprising at least one electromagnetic radiation transmission device, said at least one electromagnetic radiation transmission device coupled to said frame.

3. The sustainable energy system for pelagic deployment of claim 1, wherein said upper portion comprises a shaft.

4. The sustainable energy system for pelagic deployment of claim 1, wherein said frame further comprises a truss structure.

5. The sustainable energy system for pelagic deployment of claim 1, wherein said at least one pair of water turbine generators is configured to rotate in opposing directions.

6. The sustainable energy system for pelagic deployment of claim 1, wherein said at least one pair of water turbine generators is disposed within said frame.

7. The sustainable energy system for pelagic deployment of claim 1, wherein said at least one wind turbine generator is configured to prevent excessive angular speed.

8. The sustainable energy system for pelagic deployment of claim 1, wherein said rotatable joint further comprises at least two discs.

9. The sustainable energy system for pelagic deployment of claim 1, further comprising an antenna coupled to said frame.

10. The sustainable energy system for pelagic deployment of claim 1, further comprising a power handler.

11. The sustainable energy system for pelagic deployment of claim 1, wherein when said sustainable energy system comprises at least two wind turbines, said at least two wind turbines are configured such that at least one wind turbine has propellers that are smaller than at least one other wind turbine.

12. The sustainable energy system for pelagic deployment of claim 1, wherein said at least one pair of water turbines is configured such that at least one of said pair of water turbines is geared to slower water current speeds.

13. The sustainable energy system for pelagic deployment of claim 1, wherein when said sustainable energy system comprises at least two wind turbines, said at least two wind turbines are configured such that at least one wind turbine is designed to operate at a different peak windspeed range than at least one other wind turbine.

* * * * *